(12) United States Patent
Cui (10) Patent No.: US 10,280,050 B2
(45) Date of Patent: May 7, 2019

(54) WINCH WITH MULTIPLE WORK MODES

(71) Applicant: Ningbo Lianda Winch Co., Ltd., Ningbo (CN)

(72) Inventor: Xiaojun Cui, Ningbo (CN)

(73) Assignee: NINGBO LIANDA WINCH CO., LTD., Ningbo (CN)

( * ) Notice: Subject to any disclaimer, the term of this patent is extended or adjusted under 35 U.S.C. 154(b) by 22 days.

(21) Appl. No.: 15/604,665

(22) Filed: May 25, 2017

(65) Prior Publication Data

US 2018/0305188 A1    Oct. 25, 2018

(30) Foreign Application Priority Data

Apr. 24, 2017   (CN) ..................... 2017 2 0430155 U (51) Int. Cl.
| | |
|---|---|
| *B66D 1/12* | (2006.01) |
| *B66D 1/22* | (2006.01) |
| *F16H 3/66* | (2006.01) |
| *F16H 3/44* | (2006.01) |

(52) U.S. Cl.
CPC ............... *B66D 1/225* (2013.01); *B66D 1/12* (2013.01); *F16H 3/66* (2013.01); *F16H 2200/0034* (2013.01)

(58) Field of Classification Search
CPC .................................. B66D 1/225; B66D 1/22
See application file for complete search history.

(56) References Cited

U.S. PATENT DOCUMENTS

| | | | | |
|---|---|---|---|---|
| 2008/0116430 A1* | 5/2008 | Elliott | ...................... | B66D 1/22 254/355 |
| 2016/0068376 A1* | 3/2016 | Fretz | ........................ | B66D 3/00 254/219 |
| 2017/0320709 A1* | 11/2017 | Frazier | ..................... | B66D 1/22 |

FOREIGN PATENT DOCUMENTS

| | | |
|---|---|---|
| CN | 103171986 A | 6/2013 |
| CN | 106006420 A | 10/2016 |

\* cited by examiner

*Primary Examiner* — Jacob S. Scott
*Assistant Examiner* — Murad Jahmani
(74) *Attorney, Agent, or Firm* — Gokalp Bayramoglu (57) ABSTRACT

The present disclosure discloses a winch comprising a transmission shaft disposed in a longitudinal direction, a motor in drivable connection with the transmission shaft, a three-stage center wheel rotatably mounted on the transmission shaft, an upper planetary wheel frame mounted on the three-stage center wheel, a lower planetary wheel right frame mounted on the outer side of the three-stage center wheel, a convex extending from an end of the upper planetary wheel frame, a connecting ring mounted on the three-stage center wheel which is longitudinally movable relative to the convex, and a position control mechanism to control longitudinal movement of the transmission shaft, wherein the three-stage center wheel is in contact with one end of the connecting ring, and a spring is disposed between the other end of the connecting ring and the upper planetary wheel frame.

11 Claims, 6 Drawing Sheets

WINCH WITH MULTIPLE WORK MODES

CROSS REFERENCE TO RELATED APPLICATIONS

This application is based upon and claims priority to Chinese Patent Application No. 201720430155.8, filed on Apr. 24, 2017, the entire contents of which are incorporated herein by reference.

TECHNICAL FIELD

The present disclosure relates to a winch, and in particular, to a winch with multiple work modes.

BACKGROUND OF THE INVENTION

A winch is a warping cone having means for driving power, decelerating and braking, which may be used for winding and storing ropes with the help of the driving power. A winch also includes self-protection and traction components equipped on vehicles or ships with an axis perpendicular to a deck. Winches are usually used for rescuing in harsh environments such as snowy grounds, swamps, seashores or muddy roads. In other situations, winches may be used for clearing obstacles, dragging items and installing equipments. As a necessary safety device, winches are applied in various occasions of utilization such as military and police, oil, hydrology, environmental protection, forestry, transportation, public security, border control, fire emergency and other outdoor activities. Off-road vehicles, agricultural vehicles, ATV all-terrain vehicles, yachts, fire rescue vehicles, road wreckers and other special-purpose vehicles are among vehicles which are usually equipped with winches.

A Chinese patent number ZL201310063776.3 discloses a winch apparatus including a driving component, a transmission shaft, a deceleration mechanism, a clutch mechanism, and a roll tube. The driving component is connected to the transmission shaft. The deceleration mechanism is drivably connected to the deceleration mechanism through the roll tube. The deceleration mechanism is drivably connected to the roll tube through the clutch mechanism. The winch apparatus is characterized in that one end of the transmission shaft is slidably engaged with an output end of the driving component, a reset spring is disposed between the one end of the transmission shaft and the output end of the driving component, the reset spring surrounds the transmission shaft, one end of the reset spring is in contact with the output end of the driving component, the other end of the reset spring is in contact with a retaining ring connected to the transmission shaft. The clutch mechanism includes a pushing component which is in contact with the other end of the transmission shaft and used to push the transmission shaft in an axial direction, and a transmission component rotatably disposed on the transmission shaft which is used to drivably connect the roll tube and the deceleration mechanism by sliding axially with the transmission shaft.

Another winch of the prior arts is disclosed in Chinese Patent Number ZL201610473915.3 which enables a winch to work in multiple word modes such as a high speed mode, a low speed mode and an idle mode. The winch as disclosed comprises a motor, a transmission shaft, a roll tube, a first planetary wheel component, a second planetary wheel component, and a third planetary wheel component. A spline and a three-stage center wheel are disposed between the second planetary wheel component and the third planetary wheel component. The spline and the three-stage center wheel are moveable in response to movement of the transmission shaft. The winch as disclosed is operable in three work modes by moving the spline along with the transmission shaft. In a first work mode, the spline is drivably connected to both the second planetary wheel component and the third planetary wheel component. In a second work mode, the second planetary wheel is drivably connected to the second planetary wheel component. In a third work mode, the spline is drivably connected to both the second planetary wheel component and the three-stage center wheel. A resetting spring is connected to the three-stage center wheel which is used to push or reset the resetting spring. The winch comprises a work mode controlling mechanism to enable axial movement of the transmission shaft thereby switching the spline amongst the work modes described above. However, the winch as disclosed implements a spline to connect the second planetary wheel component, the third planetary wheel component and the three-stage center wheel. During switching of work modes, a spline incompletely engaged would cause stuck of the planetary gearbox and damage the inner structure of the winch.

SUMMARY OF THE INVENTION

The present disclosure discloses a winch comprising: a transmission shaft disposed in a longitudinal direction, a motor in drivable connection with the transmission shaft, a three-stage center wheel rotatably mounted on the transmission shaft, an upper planetary wheel frame mounted on the three-stage center wheel, a lower planetary wheel right frame mounted on the outer side of the three-stage center wheel, a hollow cylinder extending from an end of the upper planetary wheel frame, a connecting ring mounted on the three-stage center wheel which is longitudinally movable relative to the hollow cylinder, and a position control mechanism to control longitudinal movement of the transmission shaft, wherein the three-stage center wheel is in contact with one end of the connecting ring, and a spring is disposed between the other end of the connecting ring and the upper planetary wheel frame.

In some embodiments, the three-stage center wheel comprises one of a shaft shoulder on an outer wall, said shaft shoulder being in contact with the connecting ring.

In some embodiments, the three-stage center wheel comprises a positioning ring on an outer wall, said positioning ring being in contact with the connecting ring.

In some embodiments, the spring is mounted between a first ring disposed on the connecting ring and a second ring disposed on the upper planetary wheel frame.

In some embodiments, the hollow cylinder comprises inner gear teeth, and the connecting ring comprises outer connecting ring gear teeth adapted to the inner gear teeth.

In some embodiments, the position control mechanism comprises a backstopping clutch connected to the motor, a snap ring disposed on the transmission shaft, a retainer spring disposed between the snap ring and the backstopping clutch and a position adjusting component disposed on an end of the transmission shaft, wherein the position adjusting component comprises a handle, a shift fork in connection with the handle, a clutch stand in contact with the transmission shaft, and a rotating ramp component to control longitudinal movement of the clutch stand.

In some embodiments, the rotating movement of the shift fork is consistent with the clutch stand.

In some embodiments, the rotating ramp component comprise a raised ramp to allow movement of the transmission shaft toward one end, a sunken ramp to allow movement of the transmission shaft toward the other end, and two flat ramps to maintain the transmission shaft in a substantially central position.

In some embodiments, the two flat ramps are disposed oppositely.

In some embodiments, and the raised ramp and the sunken ramp are disposed between the two flat ramps.

In some embodiments, the winch further comprises a transmission spline disposed on the transmission shaft adjacent to the three-stage center wheel, and two retaining rings disposed oppositely on the transmission shaft, wherein the transmission spline and the three-stage center wheel are located between the two retaining rings.

In some embodiments, the winch is operable in a first work mode in which the connecting ring engages with both the lower planetary wheel right frame and the hollow cylinder, and a gap is formed between the three-stage center wheel and the upper planetary wheel frame.

In some embodiments, the winch is operable in a second work mode in which the connecting ring engages with the hollow cylinder, and a gap is formed between the three-stage center wheel and the upper planetary wheel frame.

In some embodiments, the winch is operable in a third work mode in which the connecting ring engages with the hollow cylinder, and the three-stage center wheel engages with the upper planetary wheel frame.

BRIEF DESCRIPTION OF THE DRAWINGS

The present disclosure is illustrated by way of example and not limitation in the figures of the accompanying drawing, in which like references indicate similar element, and in which.

DETAILED DESCRIPTION OF THE INVENTION

One of objectives of the present disclosure is to solve at least some problems of the prior art by providing a winch with multiple work modes of high reliability which could allow smooth and precise work mode switching.

Various aspects of the illustrative embodiments of the present disclosure will be described herein using terms commonly employed by those skilled in the art. However, it will be apparent to those skilled in the art that alternate embodiments may be practiced with only some of the described aspects. For purposes of explanation, specific numbers, materials and configurations are set forth in order to provide a thorough understanding of the illustrative embodiments. It will be apparent that alternate embodiments may be practiced without the specific details. In other instances, well-known features are omitted or simplified in order not to obscure the illustrative embodiments.

It will be understood that, although the terms first, second, third, etc. may be used herein to describe various elements, these elements should not be limited by these terms to indicate or imply any relative importance. These terms are only used to distinguish one element from another. For example, a first element could be termed a second element without departing from the scope of the present disclosure. The terms center, upper, lower, left, right, vertical, lateral, inner, outer, etc. may indicate directions or positions as illustrated in some of the drawings. These terms are only used in order not to obscure the description, and should not be construed as an indication of a particular positional relation or sequence. As used herein, the term and/or includes all combinations of one or more of the associated listed items. The terms connected, coupled or any variant thereof means any connection or coupling either direct or indirect between two or more elements. Such a coupling or connection between the elements can be physical, electrical, logical or a combination thereof.

As shown in FIGS. 1-6, a winch according to some embodiments include a motor 7, a transmission shaft 4, a transmission spline 61, a warping cone 6, retaining rings 41, a deceleration gearbox 71, a connecting ring 8, a spring 9, a plurality of planetary wheel components and a work mode control mechanism 5.

In some embodiments, the motor 7 is disposed on one end of the warping cone 6, and the deceleration gearbox 71 is disposed on the other end of the warping cone 6. The transmission shaft 4 is connected to an output shaft of the motor 7 on one of its ends. The transmission shaft 4 extends through the warping cone 6. The other end of the transmission shaft 4 reaches into the deceleration gearbox 71. The work mode control mechanism 5 which is used to enable axial movement of the transmission shaft 4 is located outside of the gearbox 71. The plurality of planetary wheel components are contained with the gearbox 71. In some embodiments, three or four planetary wheel components are comprised in the plurality of planetary wheel components. Although the embodiments as shown in the accompanying figures implement three planetary wheel components, the skilled in the art will anticipate a wide variety of alternate and/or equivalent embodiments or implementations utilizing more or less planetary wheel components to achieve the same purposes may be substituted for the examples as shown without departing from the scope of the present disclosure. In the embodiments utilizing three planetary wheel components, a first planetary wheel component 1, a second planetary wheel component 2 and a third planetary wheel component 3 are included in the deceleration gearbox 71. One end of the transmission shaft 4 is drivably connected to the first planetary wheel component 1 through the three-stage center wheel. The first planetary wheel component 1, the second planetary wheel component 2 and the third planetary wheel component 3 are connected in turn to form a deceleration transmission configuration. The first planetary wheel component 1 and the second planetary wheel component 2 are connected by conventional approach to form a two-level deceleration transmission configuration. The second planetary wheel component 2 and the third planetary wheel component 3 are connected using the transmission structure described below. In some embodiments, the upper planetary wheel frame comprises the planetary wheel frame 21 of the second planetary wheel component 2. The three-stage center wheel comprises the three-stage center wheel 31 of the third planetary wheel component 3. The lower planetary wheel right frame comprises the lower planetary wheel right frame 32 of the third planetary wheel component 3.

Figure 5:
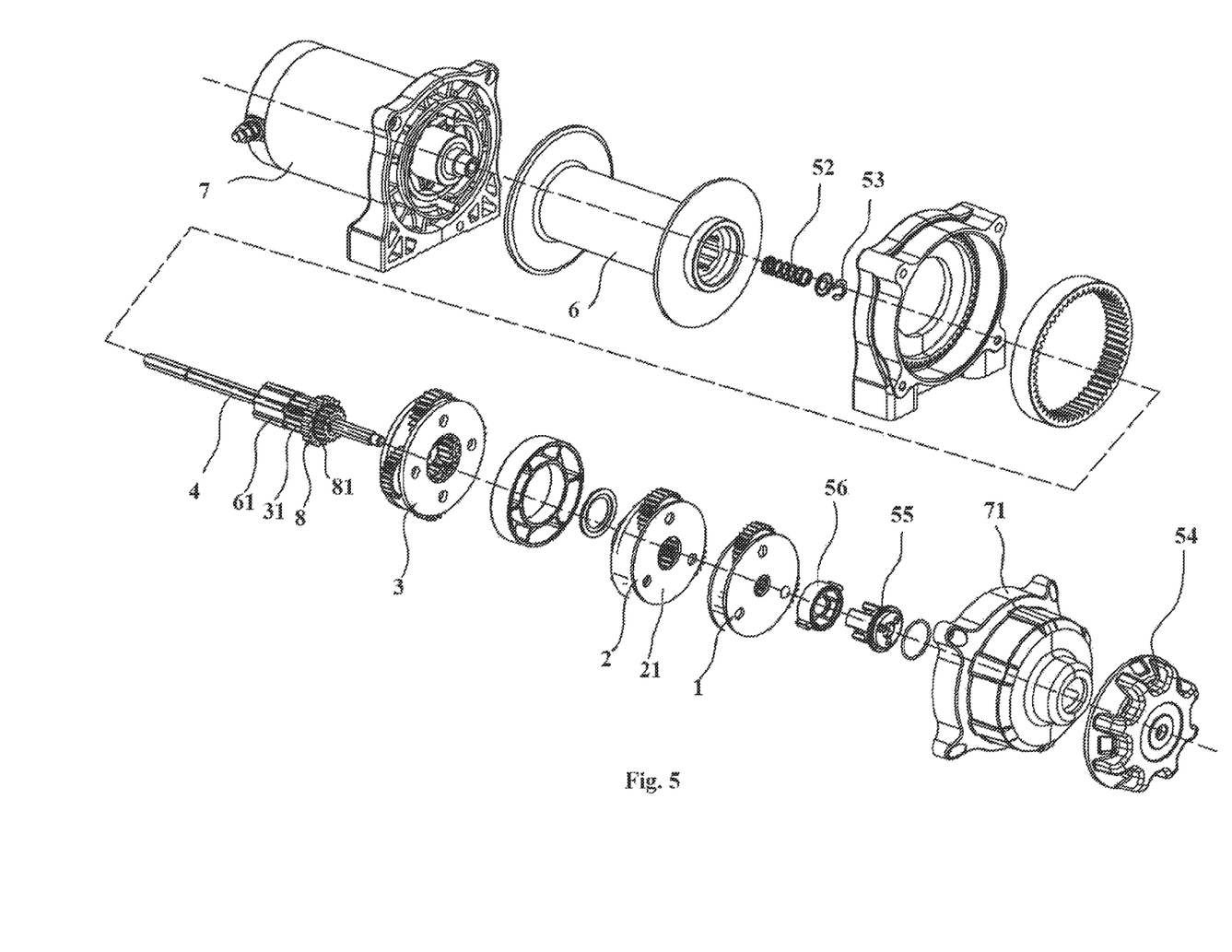
FIG. 5 is a breakdown illustration of a winch according to an embodiment.
Figure 6:
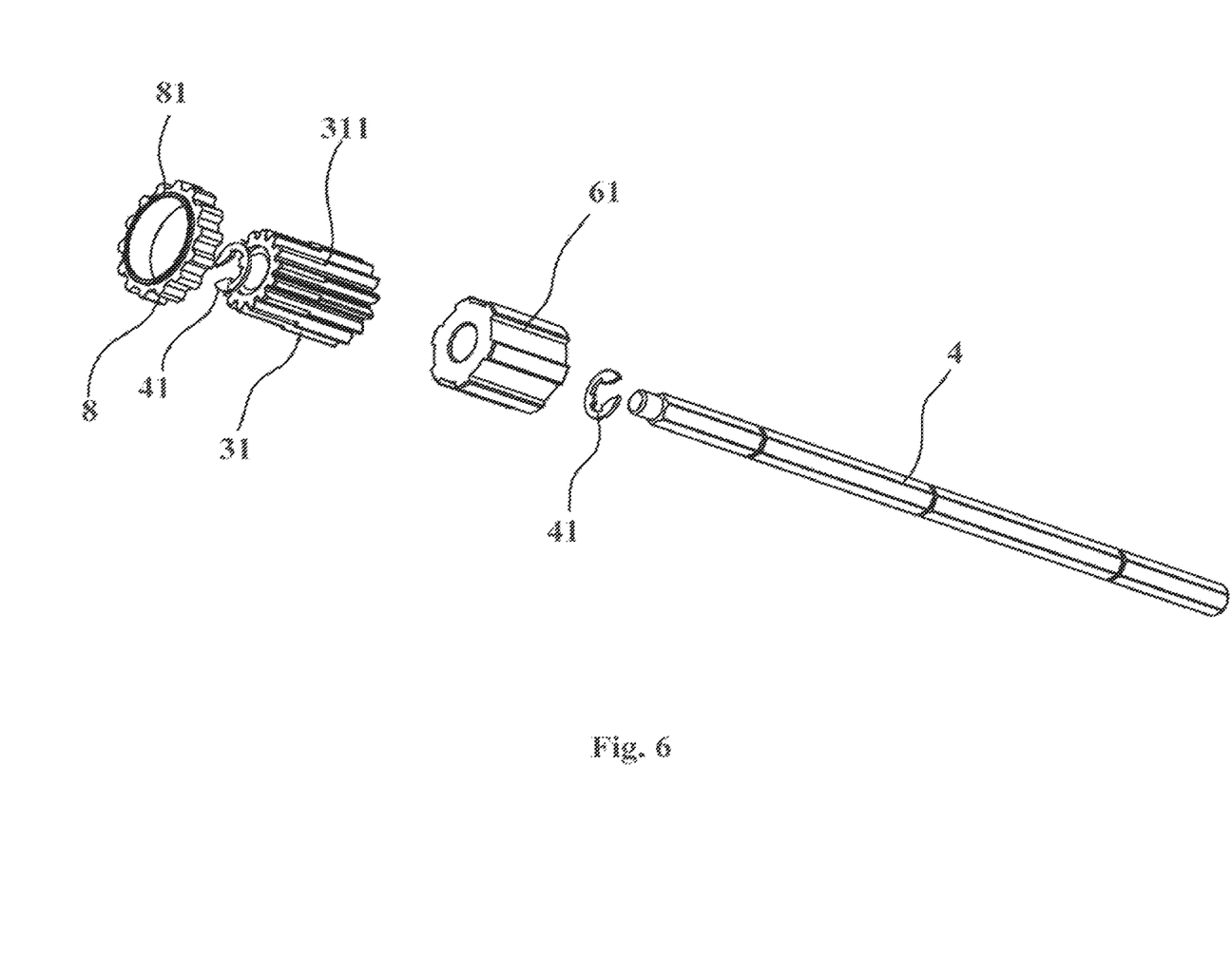
FIG. 6 is a breakdown illustration of the connecting ring, the three-stage center wheel and the transmission shaft of FIG. 5.

The transmission structure between the second planetary wheel component 2 and the third planetary wheel component 3 is discussed in detail hereinafter. Two retaining rings 41 are disposed oppositely on the transmission shaft 4. A transmission spline 61 and the three-stage center wheel 31 are located between the two retaining rings 41. The transmission spline 61 is in drivable connection with the warping cone 6 to enable rotation of the warping cone 6. In some embodiments, the transmission spline 61 is a rectangular spline. The transmission spline 61 and the three-stage center wheel 31 are rotatably located on the transmission shaft 4. The lower planetary wheel right frame 32 of the third planetary wheel component 3 is disposed on the three-stage center wheel 31. The planetary wheel components 34 of the third planetary wheel component 3 is disposed on and in engagement with the transmission spline 61. The planetary wheel components 34 are disposed between the lower planetary wheel left frame 33 and the lower planetary wheel right frame 32. The planetary wheel components 34 engage with the three-stage center wheel 31. Furthermore, the planetary wheel frame 21 is mounted on the three-stage center wheel 31. A hollow cylinder 211 extends from an end of the planetary wheel frame 21. The hollow cylinder 211 comprises inner gear teeth on its inner wall. The planetary wheel frame 21 also comprises inner gear teeth in a substantial central position which may engage the inner gear teeth on the hollow cylinder 211. Similarly, the lower planetary wheel right frame 32 comprises inner gear teeth in a substantial central position. A connecting ring 8 is disposed on the three-stage center wheel 31. The left end of the connecting ring 8 is in contact with the outer wall of the three-stage center wheel 31. Various implementations are possible for achieving contact of the connecting ring 8 with the three-stage center wheel 31. In some embodiments, the connecting ring 8 is in contact with a shaft shoulder 311 disposed on the outer wall of the three-stage center wheel 31. In some embodiments, the connecting ring 8 is in contact with a position ring disposed on the outer wall of the three-stage center wheel 31. A spring 9 is disposed between the right end of the connecting ring 8 and the upper planetary wheel frame 21. In order to improve the installing reliability of the spring 9, a first ring 81 is formed on the right end of the connecting ring 8. The spring 9 can be disposed between the first ring 81 and a second ring formed on the outer wall of the upper planetary wheel frame 21. A second ring is formed on the outer wall of the upper planetary wheel frame 21. The two ends of the spring 9, and particularly, two inner rings on the ends of the spring 9 are connected to the first ring 81 and the convex ring, such that the two ends of the spring 9 are secured. Outer connecting ring gear teeth are formed on the outer wall of the connecting ring 8 which are adapted to the inner gear teeth on the hollow cylinder 211.

Figure 1:
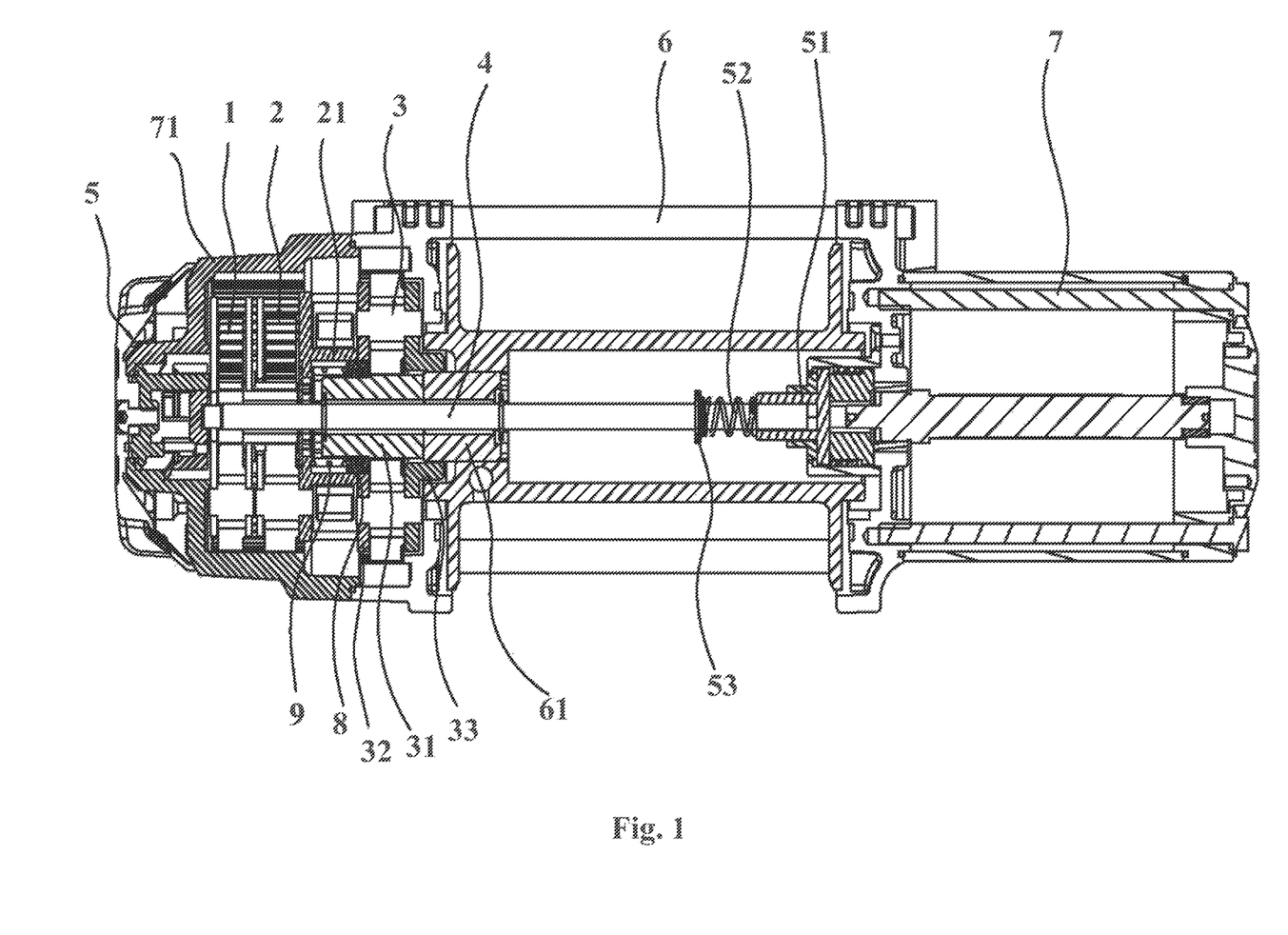
FIG. 1 is a schematic illustration of the overall structure of a winch in a high speed work mode according to an embodiment.
Figure 2:
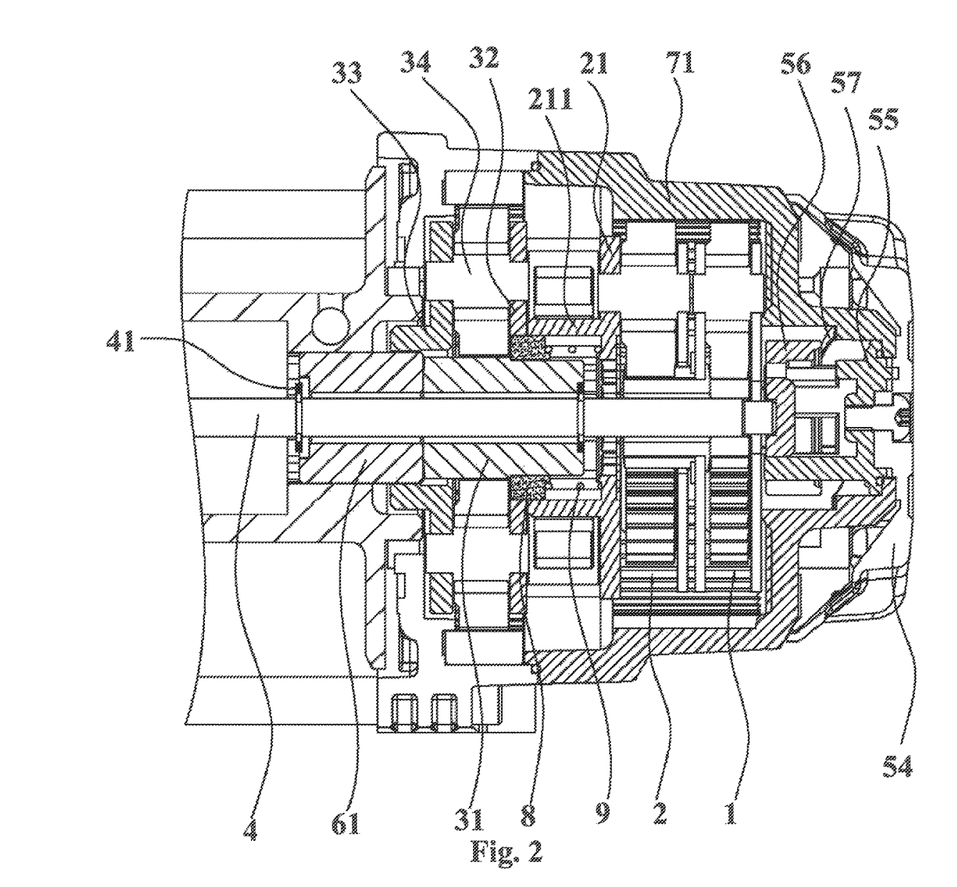
FIG. 2 is a schematic illustration of a winch in a high speed work mode according to an embodiment.
Figure 3:
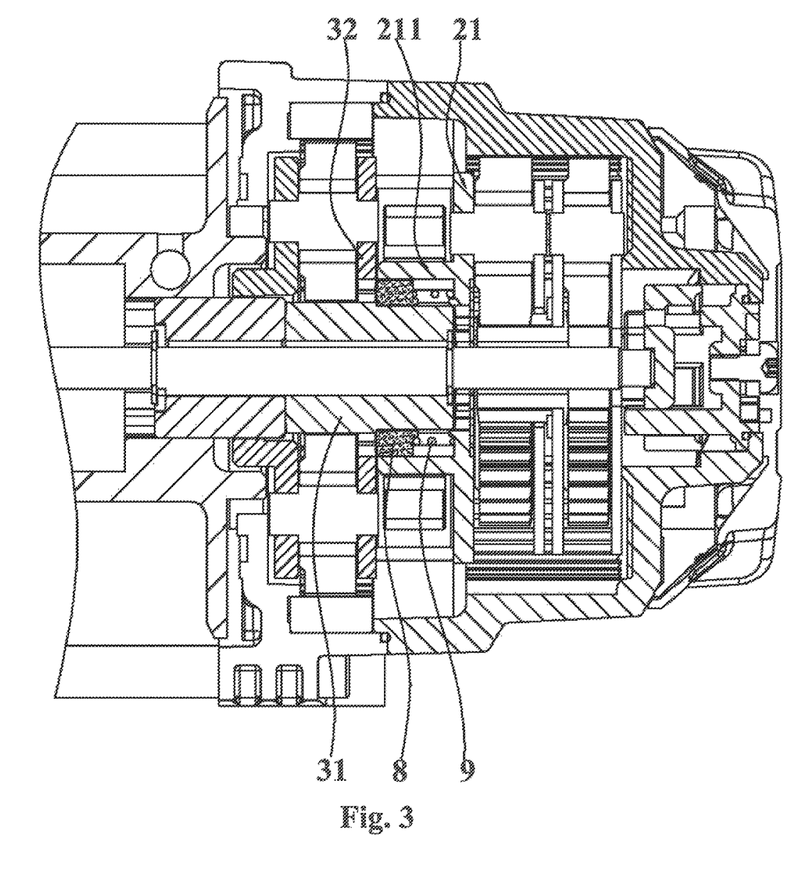
FIG. 3 is a schematic illustration of a winch in an idle work mode according to an embodiment.
Figure 4:
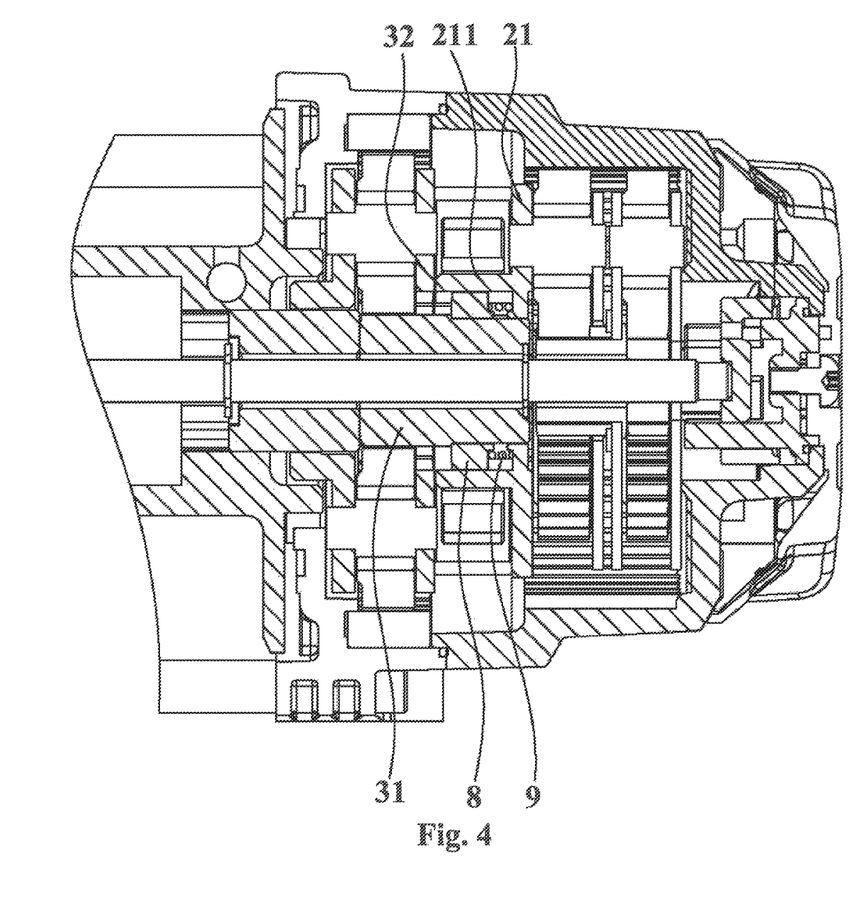
FIG. 4 is a schematic illustration of a winch in a low speed work mode according to an embodiment.

Three work modes as shown in the FIGS. 2-4 are possible for the transmission shaft 4 using the work mode control mechanism 5. In a first work mode where the transmission shaft 4 is positioned on the left end, the connecting ring 8 engages with both the lower planetary wheel right frame 32 and the inner gear teeth on the hollow cylinder 211, and a gap is formed between the three-stage center wheel 31 and the upper planetary wheel frame 21. In a second work mode where the transmission shaft 4 is positioned in a substantially central position, the connecting ring 8 engages with the inner gear teeth on the hollow cylinder 211, and a gap is formed between the three-stage center wheel 31 and the upper planetary wheel frame 21. In a third mode where the transmission shaft 4 is positioned on the right end, the connecting ring 8 engages only with the inner gear teeth on the hollow cylinder 211, and the three-stage center wheel 31 engages with the inner gear teeth on the upper planetary wheel frame 21. The three work modes would be discussed in greater detail hereinafter.

The work mode control mechanism 5 comprises common technical means in the art. Therefore, embodiments of the present disclosure would only provide simple description about structures of the work mode control mechanism 5. A backstopping clutch 51 is disposed on the left end of the transmission shaft 4 which is connected to the motor 7. One or more snap rings 53 are disposed on the left end of the transmission shaft 4. A retainer spring 52 is disposed between the snap ring 53 and the backstopping clutch 51. A position adjusting component is disposed on the right end of the transmission shaft 4. The position adjusting component comprises a handle 54, a shift fork 55 in connection with the handle 54, a clutch stand 56 in contact with the transmission shaft 4, and a rotating ramp component 57 to control movement of the clutch stand 56 along the transmission shaft 4. The shift fork 55 is inserted into the clutch stand 56, such that the rotating movement of the shift fork 55 is consistent with that of the clutch stand 56. The rotating ramp component 57 comprise a raised ramp to allow movement of the transmission shaft 4 toward the left end, a sunken ramp to allow movement of the transmission shaft 4 toward the other end or the right end, and two flat ramps disposed oppositely to maintain the transmission shaft 4 in a substantially central position. The raised ramp and the sunken ramp are disposed between the two flat ramps. Upon rotation of the handle 54, the shift fork 55 drives the clutch stand 56 to rotate in a synchronized fashion. The clutch stand 56 drives the transmission shaft 4 to move leftwards compressing the retainer spring 52 as the clutch stand 56 contacts the raised ramp of the rotating ramp component 57. The transmission shaft 4 is maintained in a substantially central position when the clutch stand 56 contacts the flat ramps of the rotating ramp component 57. When the clutch stand 56 contacts the sunken ramp of the rotating ramp component 57, the transmission shaft 4 is pushed rightwards by the retainer spring 52.

FIG. 3 illustrates an idle work mode of the winch where the transmission shaft 4 is maintained in a substantially central position, the connecting ring 8 engages only with inner gear teeth on the hollow cylinder 211, and a gap is formed between the left end of the three-stage center wheel 31 and inner gear teeth of the upper planetary wheel frame 21. The motor 7 drives one stage of the three-stage center wheel 31, which in turn drives the first planetary wheel component 1 and the second planetary wheel component 2. In particular, the upper planetary wheel frame 21 included in the second planetary wheel component 2 rotates and drives the connecting ring 8 to rotate in response thereof. Since the connecting ring 8 is in rotary connection with the three-stage center wheel 31, the connecting ring 8 rotates beyond the outer wall of the three-stage center wheel 31 without transmitting the driving force to the three-stage center wheel 31 and the lower planetary wheel right frame 32. The warping cone 6 remains motionless in the idle work mode.

When the handle 54 is rotated to drive the clutch stand 56 and push the transmission shaft 4 leftwards, the transmission shaft 4 drives the connecting ring 8 towards t. The elastic force of the spring 9 presses the connecting ring 8 against the outer wall of the lower planetary wheel right frame 32. The connecting ring 8 thus rotates in response to the upper planetary wheel frame 21. When the outer connecting ring gear teeth of the connecting ring 8 becomes aligned with the inner gear teeth of the lower planetary wheel right frame 32, the connecting ring is pushed into the inner gear teeth of the lower planetary wheel right frame 32 and engages with the lower planetary wheel right frame 32. In this situation, the clutch stand 56 contacts the raised ramp of the rotating ramp component 57. The rotation of the connecting 8 is associated with the rotation of the lower planetary wheel right frame 32. The lower planetary wheel right frame 32 in turn drives the lower planetary wheel left frame 33, the planetary wheel components 34, the transmission spline 61 and the warping cone 6. As shown in FIG. 2, the winch thus operates in a high speed work mode since the third planetary wheel component 3 takes no part in deceleration.

When the handle is rotated to push the clutch stand 56 from the flat ramps to the sunken ramp, the transmission shaft 4 moves towards the right with the retainer spring 52. The three-stage center wheel 31 push the connecting ring 8 upwards toward the upper planetary wheel frame 21. The elastic force of the spring 9 which is in contact with the connecting ring 8 becomes lesser than the elastic force of the retainer spring 52. The right end of the three-stage center wheel 31 contacts the inner gear teeth of the upper planetary wheel frame 21. As the upper planetary wheel frame 21 rotates, the retainer spring 52 pushes the three-stage center wheel 31 into engagement with the inner gear teeth of the upper planetary wheel frame 21. The clutch stand 56 then contacts the raised ramp of the rotating ramp component 57. In this situation, the upper planetary wheel frame 21 in turn drives the three-stage center wheel 31, the planetary wheel components 34, the lower planetary wheel left frame 33, the transmission spline 61 and finally the warping cone 6. As shown in FIG. 4, the winch thus operates in a low speed work mode since the third planetary wheel component 3 is used for deceleration.

In summary, the present disclosures add a connecting ring 8 outside the three-stage center wheel 31 and uses a spring 9 to maintain the connecting ring 8 between the three-stage center wheel 31 and the outer wall of the upper planetary wheel frame 21. A work mode control mechanism 5 is configured to switch the work mode of the winch by controlling axial movement of the transmission shaft 4. When the transmission shaft 4 is positioned at a left end, the winch operates in a high speed work mode in which the connecting ring 8 engages with both the lower planetary wheel right frame 32 and the hollow cylinder 211, and a gap is formed between the three-stage center wheel 31 and the upper planetary wheel frame 21. When the transmission shaft 4 is positioned at a substantially central position, the winch operates in an idle work mode in which the connecting ring 8 engages only with the hollow cylinder 211, and a gap is formed between the three-stage center wheel 31 and the upper planetary wheel frame 21. When the transmission shaft 4 is positioned at a right end, the winch operates in a low speed work mode in which the connecting ring 8 engages with the hollow cylinder 211, and the three-stage center wheel 31 engages with the upper planetary wheel frame 21. A reliable switching of different work modes can be achieved by adjusting the relative axial position of the connecting ring 8 to the three-stage center wheel 31, the upper planetary wheel frame 21 and the lower planetary wheel right frame 32.

Although certain embodiments have been illustrated and described herein for purposes of description, a wide variety of alternate and/or equivalent embodiments or implementations calculated to achieve the same purposes may be substituted for the embodiments shown and described without departing from the scope of present disclosure. This application is intended to cover any adaptations or variations of the embodiments discussed herein. Therefore, it is manifestly intended that embodiments described herein be limited only by the claims and the equivalents thereof.

The invention claimed is:

1. A winch, comprising:
   a transmission shaft disposed in a longitudinal direction;
   a motor drivably connected with the transmission shaft;
   a three-stage center wheel rotatably mounted on the transmission shaft;
   an upper planetary wheel frame mounted on the three-stage center wheel;
   a lower planetary wheel right frame mounted on an outer side of the three-stage center wheel;
   a hollow cylinder extending from an end of the upper planetary wheel frame;
   a connecting ring is mounted on the three-stage center wheel and is longitudinally movable relative to the hollow cylinder; and
   a position control mechanism for controlling a longitudinal movement of the transmission shaft;
   wherein the three-stage center wheel is in contact with a first end of the connecting ring, and a spring is disposed between a second end of the connecting ring and the upper planetary wheel frame.

2. The winch of claim 1, wherein the three-stage center wheel further comprises a shaft shoulder on an outer wall, and the shaft shoulder is in contact with the connecting ring.

3. The winch of claim 1, wherein the spring is mounted between a first ring disposed on the connecting ring and a second ring disposed on the upper planetary wheel frame.

4. The winch of claim 1, wherein the hollow cylinder further comprises inner gear teeth, and the connecting ring comprises outer connecting ring gear teeth adapted to engage with the inner gear teeth.

5. The winch of claim 1, wherein the position control mechanism further comprises a backstopping clutch connected to the motor, a snap ring disposed on the transmission shaft, a retainer spring disposed between the snap ring and the backstopping clutch and a position adjusting component disposed on an end of the transmission shaft, wherein the position adjusting component further comprises a handle, a shift fork connected with the handle, a clutch stand in contact with the transmission shaft, and a rotating ramp component for controlling the longitudinal movement of the clutch stand.

6. The winch of claim 5, wherein a rotating movement of the shift fork is consistent with a rotating movement of the clutch stand.

7. The winch of claim 6, wherein the rotating ramp component further comprises a raised ramp for allowing a movement of the transmission shaft towards one end, a sunken ramp for allowing a movement of the transmission shaft towards an other end, and two flat ramps for maintaining the transmission shaft in a central position.

8. The winch of claim 7, further comprising a transmission spline disposed on the transmission shaft adjacent to the three-stage center wheel, and two retaining rings disposed oppositely on the transmission shaft, wherein the transmission spline and the three-stage center wheel are located between the two retaining rings.

9. The winch of claim 8, wherein the winch is operable in a first work mode in which the connecting ring is engaged with both the lower planetary wheel right frame and the hollow cylinder, and a gap is formed between the three-stage center wheel and the upper planetary wheel frame.

10. The winch of claim 9, wherein the winch is operable in a second work mode in which the connecting ring is engaged with the hollow cylinder, and a gap is formed between the three-stage center wheel and the upper planetary wheel frame.

11. The winch of claim 10, wherein the winch is operable in a third work mode in which the connecting ring is engaged with the hollow cylinder, and the three-stage center wheel is engaged with the upper planetary wheel frame.

* * * * *